UNITED STATES PATENT OFFICE.

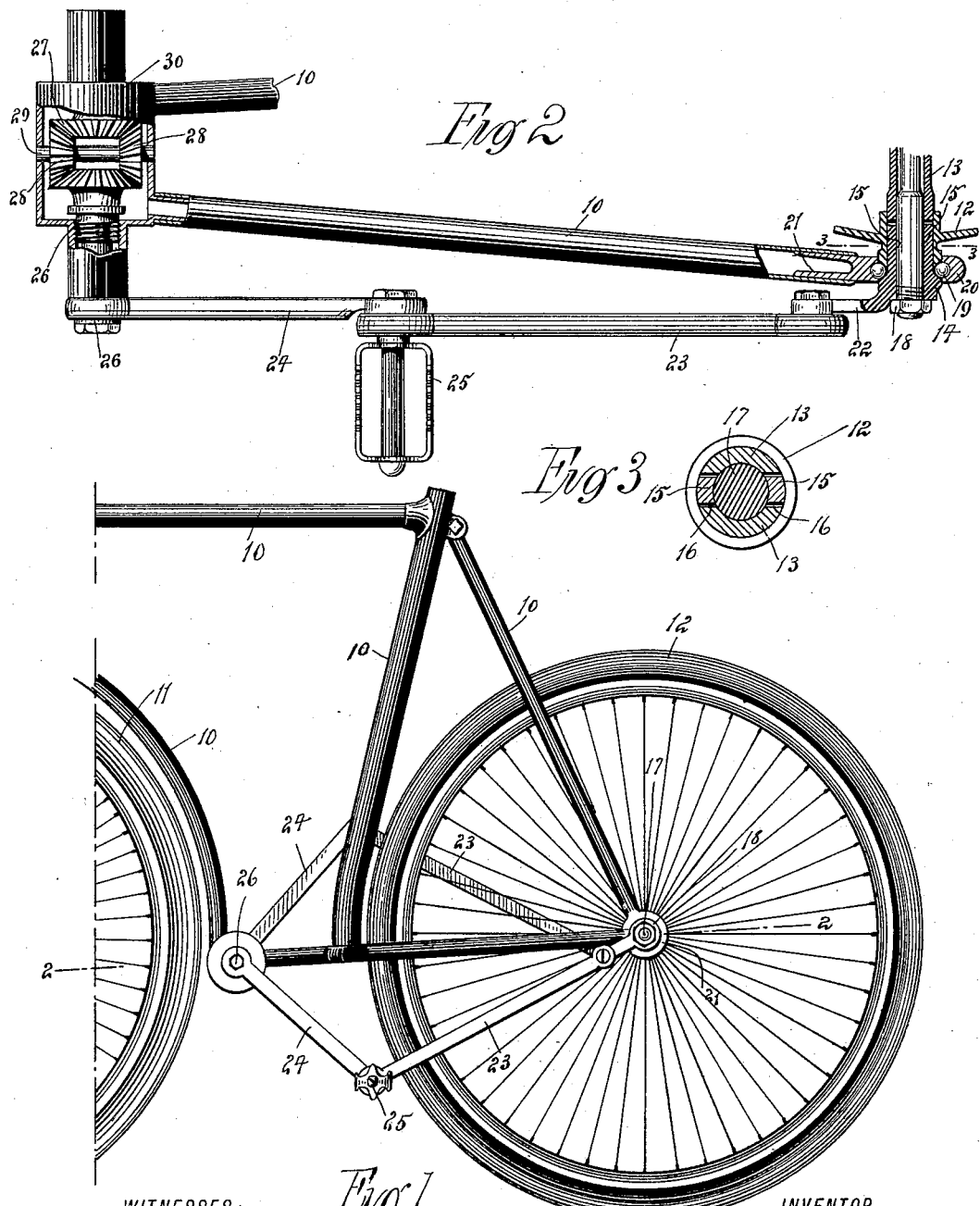

CARL NORDELL, OF STAMFORD, CONNECTICUT.

BICYCLE.

SPECIFICATION forming part of Letters Patent No. 614,884, dated November 29, 1898.

Application filed June 16, 1896. Serial No. 595,762. (No model.)

*To all whom it may concern:*

Be it known that I, CARL NORDELL, of Stamford, in the county of Fairfield and State of Connecticut, have invented certain new and useful Improvements in Bicycles, of which the following is a full, clear, and exact description.

My invention relates to improvements in bicycles, and more particularly to the driving mechanism for such machines.

The object of my invention is to produce a very simple driving mechanism which is applicable to any usual form of bicycle, which is very cheap and simple in construction, and which enables a wheel to be driven very easily or else driven with great speed by the use of greater power.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a broken side elevation of the machine embodying my invention. Fig. 2 is a broken plan view, partly in section; and Fig. 3 is a cross-section on the line 3 3 of Fig. 2.

The machine has a frame 10, which is substantially like the usual and is mounted on the customary wheels 11 and 12. The rear wheel is secured to the hollow axle 13 in part by a washer 14 at each end of the axle, which washer is provided at its inner end with keys 15, (see Figs. 2 and 3,) which fit in keyways 16 in the axle 13. The washer 14 also forms the cone for the ball-bearings, as the drawings clearly show. The washers at the ends of the axle are prevented from displacement by the bolt 17 and the nuts 18 at the ends of the bolt. The washer 14 has a ball-bearing connection, as shown at 19, with a bearing ring or box 20, which box is shaped to fit the bearing-balls and is provided with arms 21, (see Fig. 2,) which fit in the tubing of the frame 10. Only one arm is shown, but two arms are used, which enter the adjacent tubes of the frame, and thus a very simple and strong connection between the bearing-box and frame is effected, as the arm can be brazed or otherwise fastened to the tubing.

Each washer 14 has a crank 22, which is pivoted to a lever 23, and the latter at its front end is pivoted to a link 24, so as to form a toggle-joint which has a free vertical movement above and below the axial line of the rear or driving wheel, the pivot of the lever and link supporting an ordinary pedal 25. The front ends of the link 24 on each side of the machine are secured to similar shafts 26, which are journaled in suitable bearings, and the two opposite shafts 26 connect, as shown in Fig. 2, by means of the beveled gears 27 and pinions 28, the latter being secured to a shaft 29, which is journaled at right angles to the shafts 26, and the gears and shafts just referred to are inclosed by a housing 30. This gear connection between the links 24 causes one link to be raised when the other is depressed, and thus when one pedal 25 is pushed down the other rises, and the alternating motion is transmitted to the rear wheel of the bicycle by means of the levers 23 and cranks 22.

The above arrangement provides for an easy stroke and enables the rider to exert power for the full length of the stroke and to simultaneously exert power on both cranks of the driving-wheel while the pedals rise and fall with the motion of the feet, and as the action of the levers and links is similar to that of a toggle-joint great power is exerted on the driving-wheel. As illustrated, the arrangement enables the rider to use a good deal of power with comparatively little exertion; but if it is desired to drive the machine with great speed the wheels 11 and 12 are made larger than usual, or else a speed-multiplying gear is used to connect the levers 23 with the rear wheel; but I have not illustrated such a gear, as any usual kind can be employed, a good gear of this sort being illustrated in Letters Patent of the United States No. 549,005, dated October 29, 1895.

Having thus described my invention, I claim as new and desire to secure by Letters Patent—

1. The combination with a bicycle having a housing or case at the lower part of its frame and driving-cranks operatively connected with the rear wheel, of a pair of levers pivoted to the cranks, a pair of shafts journaled in opposite ends of the housing, gears on the inner ends of the shafts, pinions connecting opposite sides of the aforesaid gears, links secured to the outer ends of the aforesaid shafts and pivoted to the forward ends of the levers, so as to form a toggle-joint having a free vertical movement above and below the axial line of the rear wheel and pedals at the junction of the links and levers, substantially as described.

2. In a bicycle or like vehicle, the combination with the driving-wheel, of cranks operatively connected therewith on opposite sides of said wheel, levers connected to the cranks at one end, links connected to the other end of the levers so as to form a toggle-joint which has a free vertical movement above and below the axial line of the driving-wheel, pedals at the junction of the links and levers, together with a gear connection between the forward end of the links, whereby one link may be raised as the other is depressed and power simultaneously transmitted to the cranks on both sides of the driving-wheel, substantially as described.

CARL NORDELL.

Witnesses:
R. G. DEWEY,
ELIAS E. PALMER.